(12) United States Patent
Repka

(10) Patent No.: US 8,897,823 B2
(45) Date of Patent: *Nov. 25, 2014

(54) APPARATUSES AND METHODS FOR PROVIDING ENHANCED CONTACT LIST INFORMATION FOR MOBILE STATIONS INCLUDING MOBILE TELEPHONES

(71) Applicant: Nokia Corporation, Espoo (FI)

(72) Inventor: Mikko Repka, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,833

(22) Filed: Dec. 20, 2013

(65) Prior Publication Data

US 2014/0113599 A1    Apr. 24, 2014

Related U.S. Application Data

(63) Continuation of application No. 11/021,011, filed on Dec. 22, 2004, now Pat. No. 8,634,861.

(51) Int. Cl.
| | |
|---|---|
| *H04W 4/00* | (2009.01) |
| *H04M 3/493* | (2006.01) |
| *H04M 3/42* | (2006.01) |
| *H04M 1/04* | (2006.01) |
| *H04M 1/2745* | (2006.01) |
| *H04M 1/725* | (2006.01) |

(52) U.S. Cl.
CPC .......... *H04M 1/274516* (2013.01); *H04M 1/04* (2013.01); *H04M 3/4931* (2013.01); *H04M 1/274508* (2013.01); *H04M 1/72547* (2013.01); *H04M 2203/2066* (2013.01); *H04M 3/42374* (2013.01)
USPC ............................ 455/466; 455/522; 455/403

(58) Field of Classification Search
USPC ........ 455/466, 412.1, 412.2, 415, 414.1, 552, 455/403
See application file for complete search history.

(56) References Cited

U.S. PATENT DOCUMENTS

| | | | |
|---|---|---|---|
| 5,848,356 A | 12/1998 | Jambhekar et al. | 455/403 |
| 5,940,767 A | 8/1999 | Bourgeois et al. | 455/466 |
| 6,411,685 B1 | 6/2002 | O'Neal | 379/88.14 |
| 6,671,508 B1 | 12/2003 | Mitsuoka et al. | 455/412.1 |
| 7,013,155 B1 | 3/2006 | Ruf et al. | 455/466 |
| 2001/0024851 A1 | 9/2001 | Kubo | 438/220 |
| 2002/0128036 A1 | 9/2002 | Yach et al. | 455/552 |
| 2004/0137884 A1 | 7/2004 | Engstrom et al. | 455/414.1 |
| 2004/0137955 A1 | 7/2004 | Engstrom et al. | 455/566 |
| 2004/0193601 A1 | 9/2004 | Hu et al. | 707/9 |

FOREIGN PATENT DOCUMENTS

WO    WO-2004/017654 A1    2/2004

*Primary Examiner* — Charles Shedrick

(74) *Attorney, Agent, or Firm* — Harrington & Smith

(57) ABSTRACT

Improved contact information is provided to users of mobile stations such as cellular telephones and personal digital assistants with wireless telephony capability. In particular, the present invention displays the types of messages that a contact listed on a contact list of the mobile station can receive. In addition, the present invention provides methods and apparatus for updating this information. In one method for updating contact information, the mobile station contacts a database which stores information concerning what types of electronic messages that users of the wireless telecommunications network can receive; requests up-to-date information concerning at least one contact listed on the contact list; receives the up-to-date information, and then updates the information stored in the memory of the mobile station.

35 Claims, 10 Drawing Sheets

APPARATUSES AND METHODS FOR PROVIDING ENHANCED CONTACT LIST INFORMATION FOR MOBILE STATIONS INCLUDING MOBILE TELEPHONES

CROSS-REFERENCE TO RELATED APPLICATION

The present application is a continuation of copending U.S. patent application Ser. No. 11/021,011 filed on Dec. 22, 2004, the disclosure of which is incorporated herein by reference in its entirety.

TECHNICAL FIELD

The present invention generally concerns enhanced contact list information for use in mobile telephones, and more particularly concerns enhanced contact lists that indicate the types of messages which a contact person can receive.

BACKGROUND

In the present cellular telephone environment cellular telephone users can subscribe to multiple message services. For example, a first cellular telephone user may subscribe to voice telephony service. A second cellular telephone user may subscribe to e-mail service in addition to voice telephony service. The second user thus would be able to send and to receive both telephone calls and e-mails through her cellular telephone handset. A third user may subscribe to voice telephony service and an instant messaging service. In such a situation where users of a wireless telecommunications network regularly communicate with a large number of contacts using a wide range of telecommunication services, it may become difficult or impossible for a user of the wireless telecommunications network to remember exactly what types of messages that can be sent to other users of the wireless telecommunications network.

This can have negative consequences, limiting the benefit of other types of messaging services when compared to basic telephony service. For example, a user may send messages to another user of the wireless telecommunications network not remembering whether the contact can even receive the type of message being sent. This can result in situations where the other user never even receives the message.

In another situation, a user may continually choose to use voice telephony service knowing that other users of the wireless telecommunications network can receive telephone calls. The user may decline to use a service that is particularly suited to an environment or context such as, for example, text messaging, because the user is not sure whether the contact can receive a text message. In such a situation, the user may decline to send a message at all, knowing that in particular environments it would be inappropriate (or even prohibited) to initiate a telephone call.

Thus, those skilled in the art desire improved functionality for tracking what types of messages other users of a wireless telephony system can receive. In the ideal situation, such functionality would be added to pre-existing related functionality of the cellular telephone, for example, a contact list, to improve the usefulness of such functionality.

In addition, assuming the existence of such improved functionality, those skilled in the art would also desire methods and apparatus to update information concerning the types of messages that other users of the wireless telecommunications network can receive. For example, those skilled in the art desire a simple way for updating contact list information with new information concerning the types of messages that other users of the wireless telecommunications network can receive. In order to make updating activity as simple as possible, it would be desirable that such a system be automated.

SUMMARY OF THE PREFERRED EMBODIMENTS

A first alternate embodiment of the present invention comprises a method for use in a mobile station operable in a wireless telecommunications network, wherein the mobile station comprises at least a memory for storing contact list information, where the contact list information comprises for each listed contact a name; a telephone number; and a listing of the types of messages the contact can receive, and a display for displaying the contact list information, the method comprising: accessing the contact list information from the memory; and displaying a contact list comprised of the contact list information on the display of the mobile station, wherein the contact list for each contact on the contact list displays the types of messages the contact can receive.

A second alternate embodiment of the present invention comprises a mobile station for use in a telecommunications network, the mobile station comprising: a memory for storing (1) an operating program comprising at least a contact list routine and (2) contact list information, where the contact list information comprises for each listed contact a name; a telephone number; and the types of messages the listed contact can receive; a wireless section comprising a digital signal processor; a wireless transceiver; and an antenna; a display for displaying information; an information entry system for entering information; and a processing unit for executing the operating program, where when the processing unit executes the contact list routine of the operating program the following operations are performed: accessing the contact list information from the memory; and displaying a contact list on the display of the mobile station, wherein the contact list for each contact on the contact list displays the types of message the contact can receive.

A third alternate embodiment of the present invention comprises a computer readable memory medium for storing computer program instructions which, when executed, perform operations for controlling a contact list in a mobile station having a display, the operations comprising: receiving a request to display the contact list on the display of the mobile station; retrieving the contact list information from a memory of the mobile station, where the contact list information comprises at least names of contacts and information concerning types of messages each contact on the contact list can receive; and displaying the contact list information on the display of the mobile station, where the contact list is organized by names of the contacts, and where for each contact the types of messages the contact can receive are displayed adjacent to the contact name.

A fourth alternate embodiment of the present invention comprises a wireless communications system comprising a mobile station for use in a telecommunications network, the mobile station comprising: a memory for storing (1) an operating program comprising at least a contact list routine and (2) contact list information, where the contact list information comprises for each listed contact a name; a telephone number; and services to which the listed contact subscribes; a wireless section comprising a digital signal processor; a wireless transceiver; and an antenna; a display for displaying information; a keypad for entering information; and a processing unit for executing the operating program, where when the processing unit executes the contact list routine of the operating program the following operations are performed: accessing the contact list information from the memory; and displaying a contact list on the display of the mobile station, wherein the contact list for each contact on the contact list displays the services to which the contact subscribes; and a base station, where the base station comprises: a database for storing (1) a database operating program comprising at least a contact list maintenance routine and (2) contact list information, where the contact list information comprises for each listed contact a name; a telephone number; and services to which the listed contact subscribes; a wireless section comprising a digital signal processor; a wireless transceiver; and an antenna; and a processing unit for executing the database operating program, where when the processing unit executes the contact list routine of the operating program the following operations are performed.

Thus it is seen that embodiments of the present invention overcome limitations of the prior art. Known mobile stations do not have the ability to display in a contact list telecommunications services to which a listed contact person subscribes. Accordingly, a user wishing to send a message to another user listed on the contact list has to remember the types of messages that the target user can receive. This becomes particularly difficult as the population of the contact list increases and the number of available services increases.

In contrast, the present invention discloses a contact list which not only contains names and telephone numbers of listed contacts, but also identifies the telecommunication services to which listed contacts subscribe. As a result, a person using a mobile station made in accordance with the present invention can quickly glance at her contact list to identify the types of messages that can be sent to listed contacts. In addition, the present invention also provides the capability to quickly and easily update the information in the contact list so that a user is continually up-to-date concerning the types of messages that can be sent to listed contacts.

As the number of acquaintances of a user increases and the number of available wireless services increases, it becomes increasingly difficult for a user to keep track of the services to listed contacts subscribes. Thus it becomes more difficult to use all of the services available, since a user may elect not to use a particular service if the user cannot recall whether the intended recipient can receive the desired message type. Even in a mobile station that displays all of the services to which a contact subscribes, it can become burdensome to have to continually update the subscriber service information in the contact list.

In contrast, an aspect of the present invention comprises an automated system for updating subscriber service information on the contact list. A user can either instruct the mobile station to check for services to which listed contacts subscribe, or can automate the process so that the mobile station occasionally checks a central database for current subscriber information.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
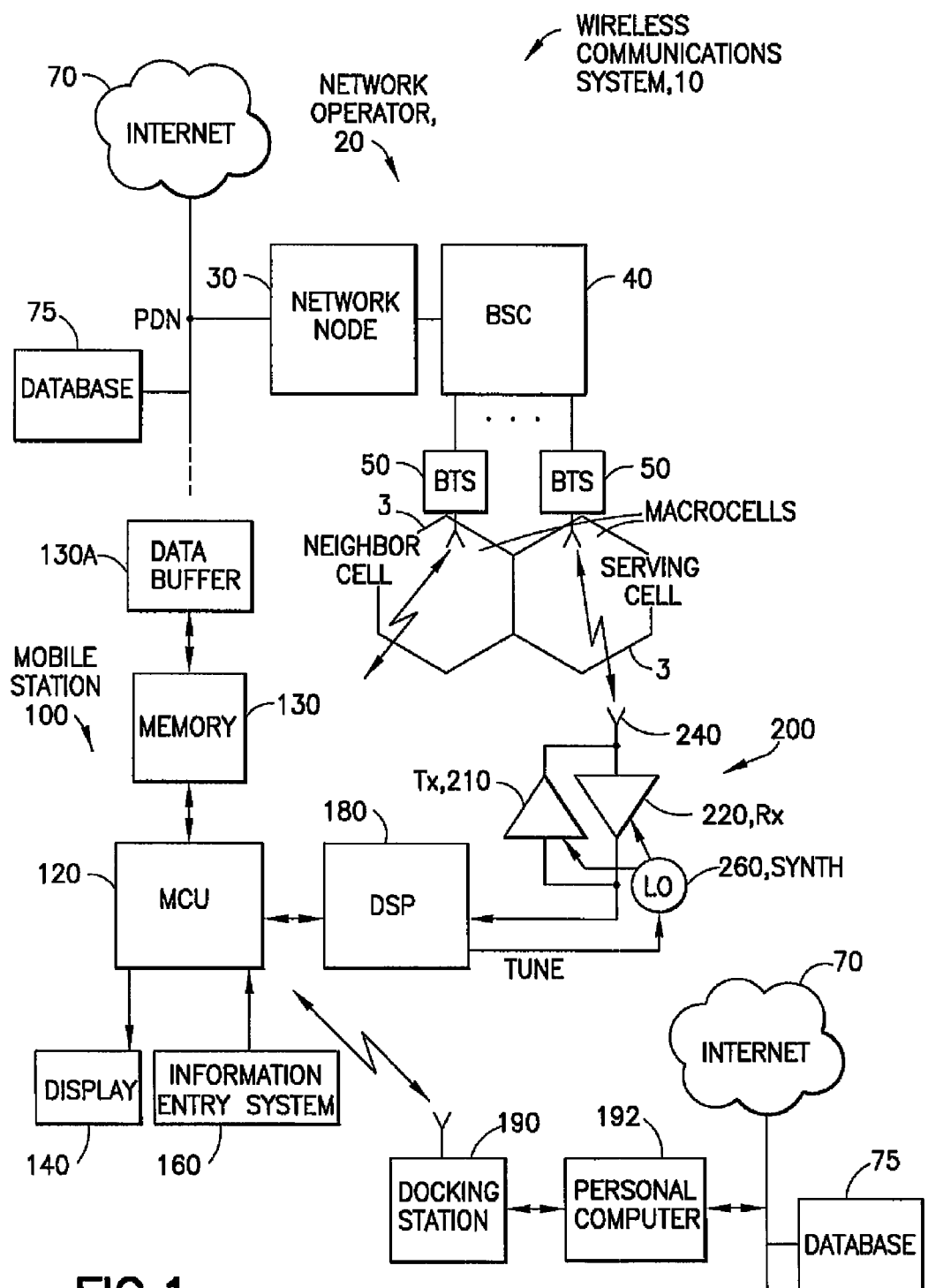
FIG. 1 is a block diagram depicting in conceptual terms a mobile station and a wireless telecommunications system in which the mobile station is operable, wherein the mobile station and wireless telecommunications system are suitable for practicing the teachings of the present invention.

FIG. 1 depicts in simplified form a block diagram of a wireless telecommunications system 10 that is suitable for practicing this invention. The wireless telecommunications system 10 includes at least one mobile station (MS) 100. Also shown is an exemplary network operator 20 having, for example, a network node 30 for connecting to a telecommunications network, such as a Public Packet Data Network or PDN; at least one base station controller (BSC) 40 or equivalent apparatus; and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile-station-originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is compatible with a code division multiple access (CDMA) air interface standard, such as one known as cdma2000, although this is not a limitation upon the practice of this invention.

The mobile station 100 typically includes a control unit or control logic, such as a microcontrol unit (MCU) 120 having an output coupled to an input of a display 140 and an input coupled to an output of an information entry system 160. The information entry system can comprise voice-activated information entry systems; touch-initiated information entry systems such as, for example, keyboards, keypads or touch screens; and combinations thereof. For example, a touch-initiated information entry system can be combined with a voice-activated information entry system in embodiments of the present invention. The mobile station 100 may be a hand-held radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

In general, various embodiments of the MS 100 can include, but are not limited to, cellular telephones, personal digital assistants (PDAs), portable computers, image capture devices such as digital cameras, gaming devices, music storage and playback appliances, Internet appliances permitting Internet access and browsing, as well as portable units or terminals that incorporate combinations of such functions.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed, for the purposes of this invention, to enable the MCU 120 to execute the software routines, layers and protocols required to implement the methods in accordance with this invention, as well as to provide a suitable user interface (UI), via display 140 and information entry system 160, for a user. The operating program also includes a contact list management routine for practicing the present invention. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver 200 that includes a transmitter 210 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

The mobile station is also operable with a docking station 190. In various embodiments, the docking station may be capable of accessing the Internet 70 directly, or through a personal computer 192 having a connection to the Internet 70. Further, the mobile station may be capable of accessing the Internet 70 through an intermediate short-range wireless connection, (e.g., a Bluetooth connection) enabled by the docking station 190 or personal computer 192.

Figure 2:
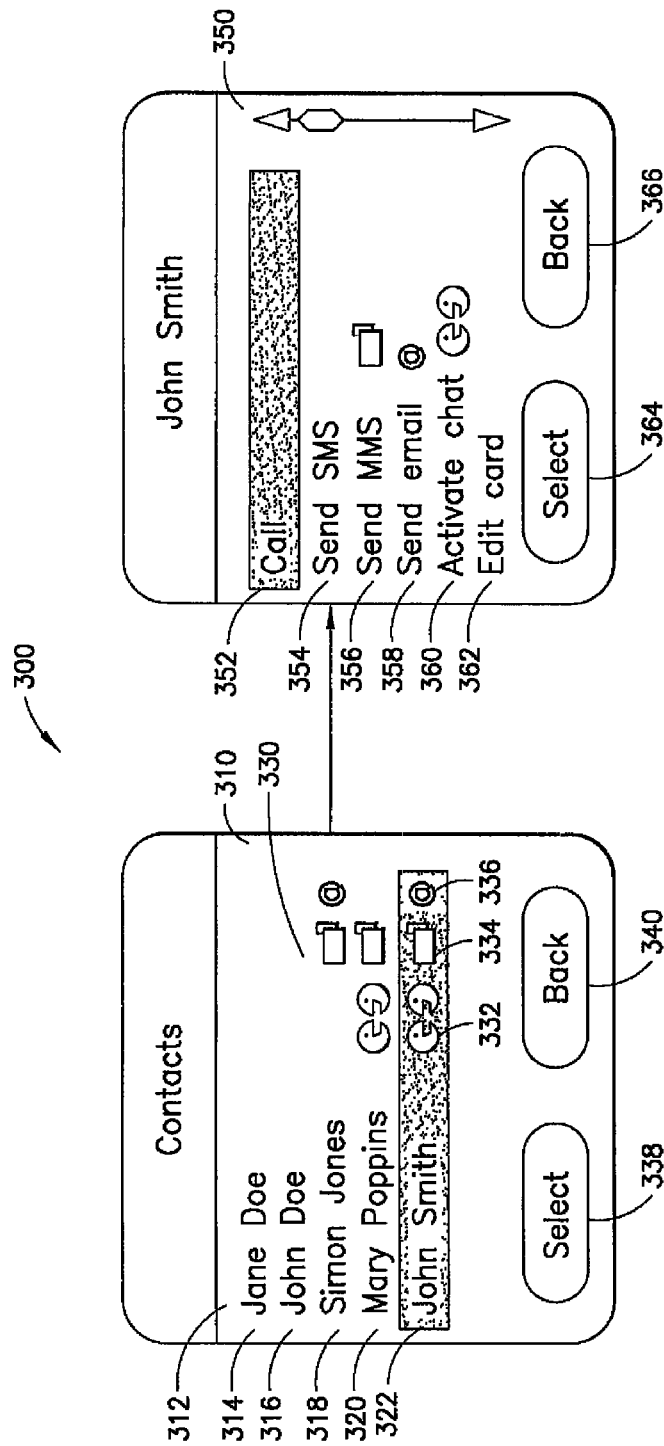
FIG. 2 depicts a graphical user interface of a mobile station displaying a contact list interface made in accordance with the present invention and the operation of same.

FIG. 2 depicts a graphical user interface of a mobile station 100 displaying a contact list screen 300 made in accordance with the present invention. FIG. 2 also depicts the operation of aspects of a contact list management routine operating in accordance with the present invention. The contact list screen 300 comprises a display field 310 having a contact name column 312 where are displayed the names of contacts 314, 316, 318, 320 and 322. The contact list screen further comprises a message service display area 330 graphically indicating the types of messages that a named contact can receive. In the example depicted in FIG. 2, there are icons corresponding to chat messages 332; multimedia message service messages 334; and emails 336. This provides a particular advantage of the present invention in that a mobile station having the contact list functionality of the present invention immediately informs a user through graphical means exactly what types of messages that can be sent to a person listed on the contact list.

In alternate embodiments of the present invention icons corresponding to particular message services can change appearance to indicate the status of a contact, for example, whether the contact is currently connected to the telecommunications network.

The operation of the contact list management routine of the present invention is also depicted in FIG. 2. A user of the mobile station would scroll down through the contact list displayed in column 312 with a cursor (not shown). When the user reaches the name of the contact to which the user would like to send a message, the user chooses the "select" button 338. This launches an individual contact message session screen 350. The individual contact message session screen 350 allows a user to initiate a message session by selecting the type of message that the user would like to send to the selected contact. The user scrolls through the list of message services available for the particular contact until the desired message service is reached. In the embodiment depicted in FIG. 2, there is an entry for telephone service 352; short message service 354; multimedia message service 356; e-mail 358; instant message "chat" service 360; and an entry to launch a routine to edit the contact information 362. The user would then select the message service with the select button 364.

Figure 3:
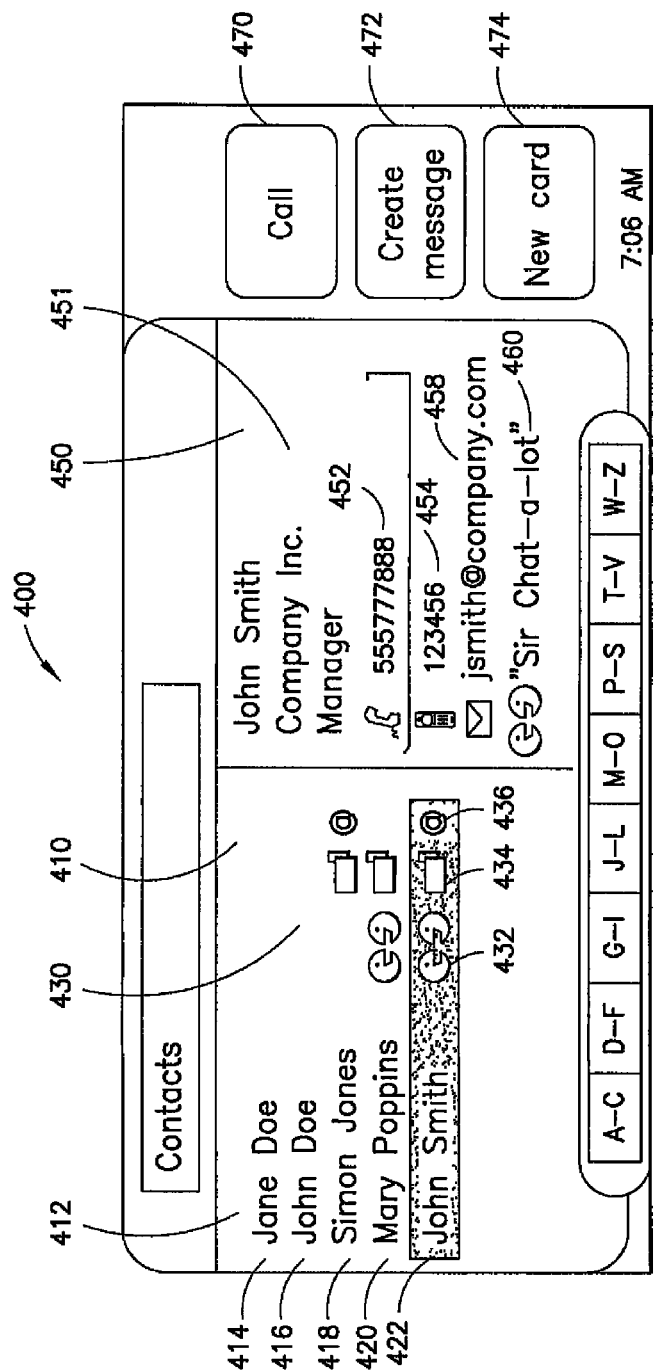
FIG. 3 depicts a graphical user interface of a mobile station displaying an alternate contact list interface made in accordance with the present invention.

FIG. 3 depicts an alternate embodiment of a contact list screen made in accordance with the present invention typically for use in a mobile station having a larger display. The contact list screen comprises two portions—a contact list portion 410 and an individual contact portion 450. The contact list portion 410 has a column where the names of contacts 414, 416, 418, 420, and 422 are displayed. The contact list portion 410 further comprises a message service display area 430 graphically indicating the types of messages that a listed contact can receive. Similar to the embodiment depicted in FIG. 2, there are icons corresponding to chat messages 432; multimedia message service messages 434; and e-mails. As in the case of the embodiment depicted in FIG. 2, the display of available services is a particular advantage of the present invention in that a user of a mobile station having the contact list functionality of the present invention is immediately informed through graphical means exactly what types of messages can be sent to a person listed on the contact list.

The contact list screen 400 depicted in FIG. 3 further comprises an individual contact display portion 450 for displaying information concerning a particular contact in the contact list. In the embodiment depicted in FIG. 3, a user scrolls through the list depicted in the contact list portion with a cursor (not shown) to arrive at the desired contact. The contact information associated with that particular contact is then depicted in the individual contact display portion 450. In the embodiment depicted in FIG. 3, more detailed descriptive information concerning the contact is depicted in area 451. Further, as is apparent in the example depicted in FIG. 3, there is an icon for conventional telephone service 452; cellular telephone service 454; e-mail 458; and instant messaging "chat" service 460.

The embodiment depicted in FIG. 3 further comprises additional functionality. In particular, as the user scrolls down the list of available message types that can be sent to an individual contact, the user can initiate a message session with buttons 470 and 472. For example, as the user scrolls down the list and encounters a type of telephony service, the user can initiate a telephone session with the call button 470. In contrast, when the message service is text type, for example e-mail 458 or instant-messaging "chat" service 460, the user would initiate a chat session with the "create message" button 472. Further, the user could create an additional contact with the "new card" button 474.

Figure 4:
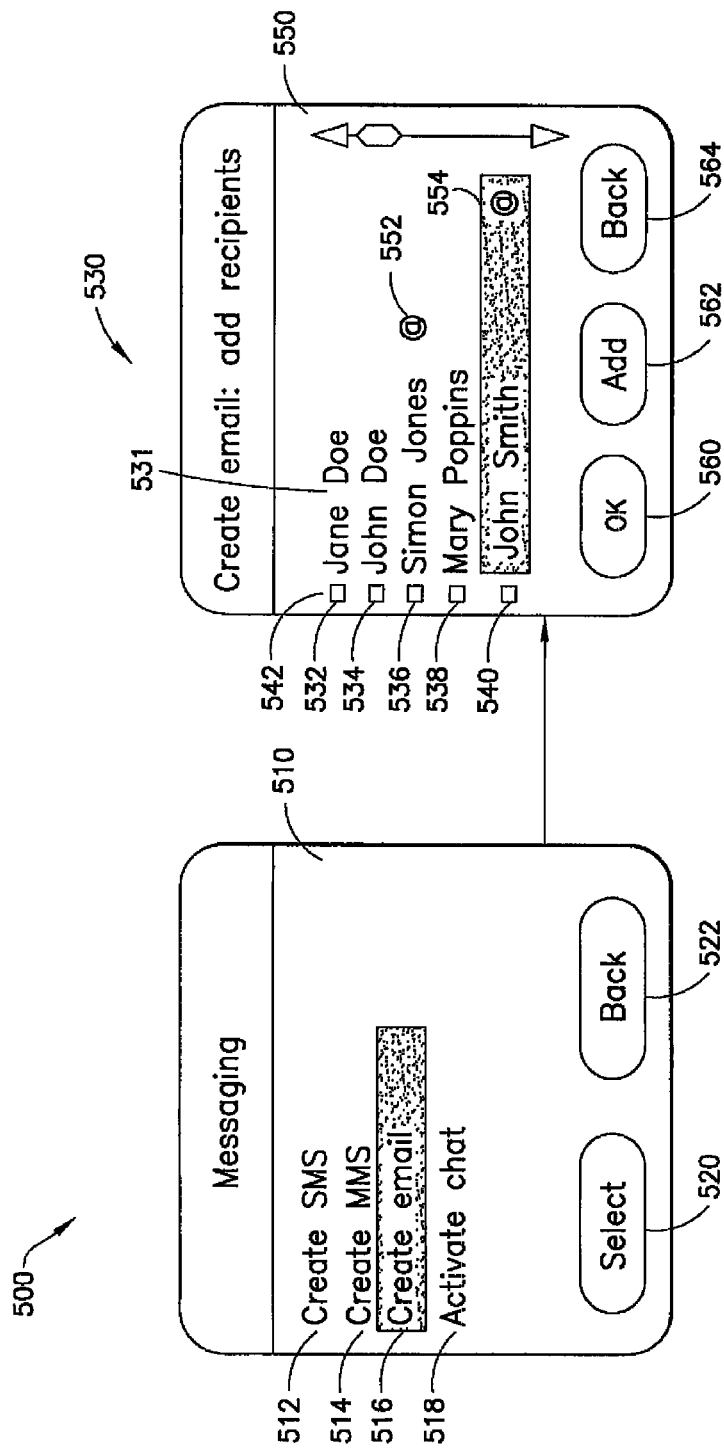
FIG. 4 depicts a graphical user interface of a mobile station displaying a contact list interface made in accordance with the present invention, and the operation of a feature which permits a user to update contact list information, all made in accordance with the present invention.

FIG. 4 depicts another manner in which the teachings of the present invention can be implemented. Message session launch screen 500 is displayed on the display 140 of a mobile station 100. The message session launch screen 500 comprises a display field 510 in which are displayed entries corresponding to available message services. In the example depicted in FIG. 4 the available message services are short message service 512; multimedia message service 514; e-mail service 516; and instant messaging "chat" service 518. A user would select one of the services with a cursor (not shown), and then launch a message session with the "select" button 520. Alternatively, the user could return to a previous screen by choosing the "back" button 522.

FIG. 4 also depicts the operation of this aspect of the present invention. By choosing the "select" button 520, an e-mail message session is launched and an e-mail addressing screen 530 surfaces. The e-mail addressing screen 530 comprises a contact list column 531 for listing contact list persons 532, 534, 536, 538 and 540. Before each listed contact's name appears a checkbox 542 for indicating whether a listed contact person is to receive an e-mail to be drafted. Not all listed contacts subscribe to e-mail message service. The message service availability column displays icons for each listed contact 552, 554 subscribing to e-mail service. In the example depicted in FIG. 4, listed contacts 532, 534 and 538 cannot receive e-mails and accordingly have no icons displayed in column 550.

The operation of the present invention is also apparent in FIG. 4. The user adds recipients to the e-mail recipient list by using a cursor button (not shown) and an "add" button 562. After the user has selected all recipients to receive the e-mail message, the user selects the "ok" button 560 which launches another screen where the message of the e-mail can be created. Alternatively, if the decides not to create an e-mail message after all, the user can select the "back" button 564 to return to a previous screen.

FIGS. 5-12 are block diagrams depicting the operation of various aspects of a contact list management routine operating in accordance with the present invention. The operations are described with reference to the apparatus depicted in FIGS. 1-4.

Figure 5:
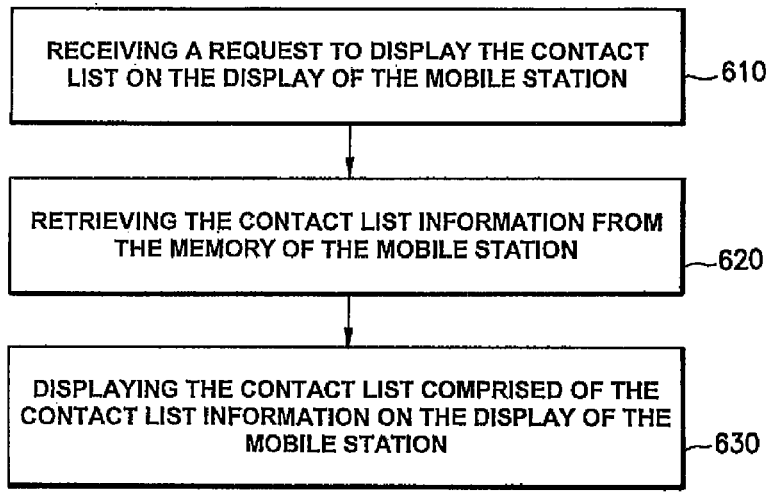
FIG. 5 is a flowchart depicting the steps of a method operating in accordance with the present invention.

FIG. 5 depicts a method operating in accordance with the present invention. The method is for use in a mobile station 100 such as, for example, a cellular telephone, operable in a wireless telecommunications network 10. The cellular telephone comprises a memory 130 for storing (1) an operating program comprising at least a contact list management routine and (2) a contact list comprised of contact list information, where the contact list information comprises for each listed contact a name; a telephone number; and the types of messages that a listed contact can receive; a wireless section comprising a digital signal processor 180; a wireless transceiver 200; and an antenna 240; a display 140 for displaying information; an information entry system 160 for entering information; and a processing unit 120 for executing the operating program. At step 610 of the method, the processing unit receives a request from the user of the mobile station 100 to display the contact list on the display 140 of the mobile station. The contact list management routine is responsive to the request and causes the processor 120 to retrieve the contact list information from the memory 130 of the mobile station 100 at step 620, and to display the contact list on the display 140 of the mobile station 100 at step 630.

In various embodiments of the method depicted in FIG. 5, icons can be used to indicate the types of messages that particular contacts can receive. In further embodiments of the method, the icons change appearance to indicate whether the contact is connected to the telecommunications network. For example, the icon may appear black-and-white when the contact is not connected, and in color when the contact is connected.

Figure 6:
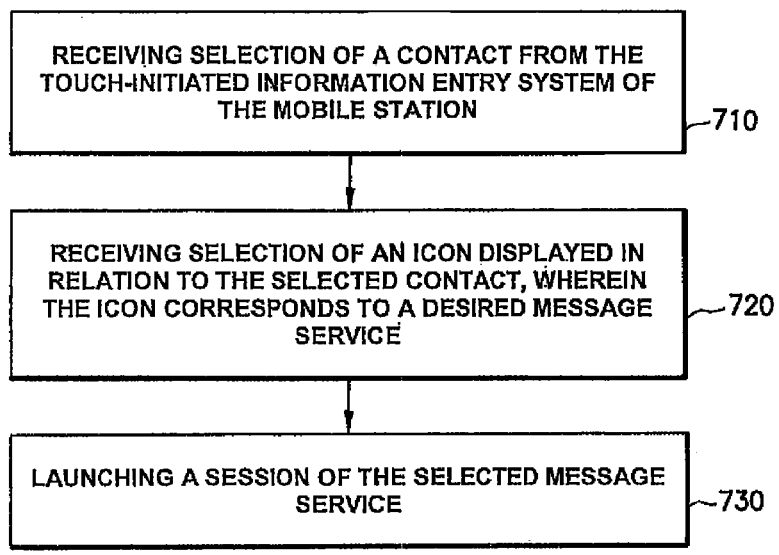
FIG. 6 is a flowchart depicting the steps of a method operating in accordance with the present invention.

FIG. 6 depicts another method operating in accordance with the present invention. The method is assumed to operate after the contact list has come to be displayed on the display 140 of the mobile station 100 by, for example, the method depicted in FIG. 5. At step 710, the contact list management routine of the mobile station operating system receives a selection of a contact from the information entry system 160 of the mobile station 100. In response to the selection of the contact, the contact list management routine emphasizes the contact list information associated with the selected contact in one embodiment. In another embodiment, the contact list information associated with the selected contact may be displayed on a new screen. In either embodiment, icons are displayed indicating the types of messages that the selected contact can receive, as depicted in FIGS. 2 and 3. At step 720, the contact list management routine receives the selection of an icon corresponding to a desired message service. In various embodiments, the selection can be made with a voice- or touch-initiated information entry system such as, for example, a keypad, keyboard or a touch screen. The selection of an icon displayed in reference to the selected contact indicates that the user of the mobile station would like to initiate a message session with the selected contact. Accordingly, at step 730, the contact list management routine launches a session of the selected message service.

Figure 7:
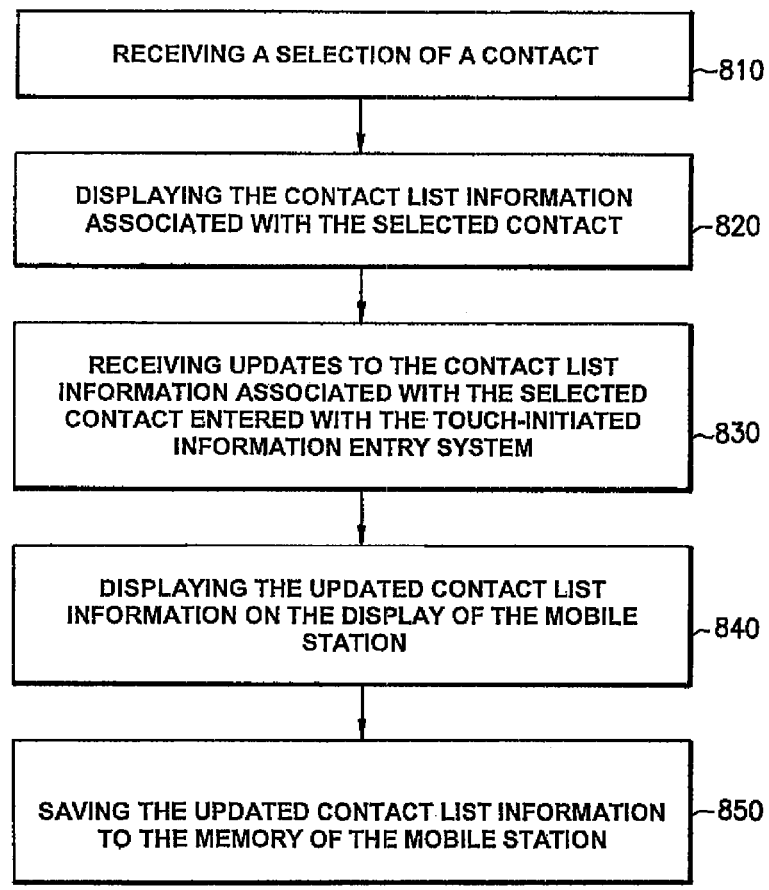
FIG. 7 is a flowchart depicting the steps of a method operating in accordance with the present invention.

FIG. 7 depicts another method operating in accordance with the present invention. The method is assumed to operate after the contact list has come to be displayed on the display 140 of the mobile station 100 by, for example, the method depicted in FIG. 5. The present method described in conjunction with FIG. 7 concerns updating of the message service information displayed in the contact list. At step 810, the contact list management routine receives the selection of a contact from a user of the mobile station 100, who has entered the selection with the information entry system 160. The contact list management routine is responsive to the selection and causes the mobile station to display the contact list information associated with the selected contact at step 820, for example, as depicted in FIGS. 2 and 3. The contact list information comprises icons which indicate the type of messages that can be sent to the selected contact. If the user is aware of a change such as, for example, the selected contact has recently subscribed to a new message service; the user can update the contact list information with this new information. In one embodiment of the present invention, the user of the mobile station can update the information by manually entering it with the information entry system 160. In such an embodiment, the mobile station 100 would receive at step 830 updates to the contact list information concerning message service availability associated with the selected contact, where the updates would be entered with the information entry system. As soon as it receives the update, the new information would be displayed at step 840 on the display 140 of the mobile station. In various situations, an icon may be deleted, indicating that the selected contact can no longer receive messages corresponding to the deleted icon, or an icon may be added, indicating that the contact can now receive messages corresponding to the added icon. The contact list management routine also causes the update concerning message service availability to be saved to the memory 130 of the mobile station 100 at step 850.

Figure 8:
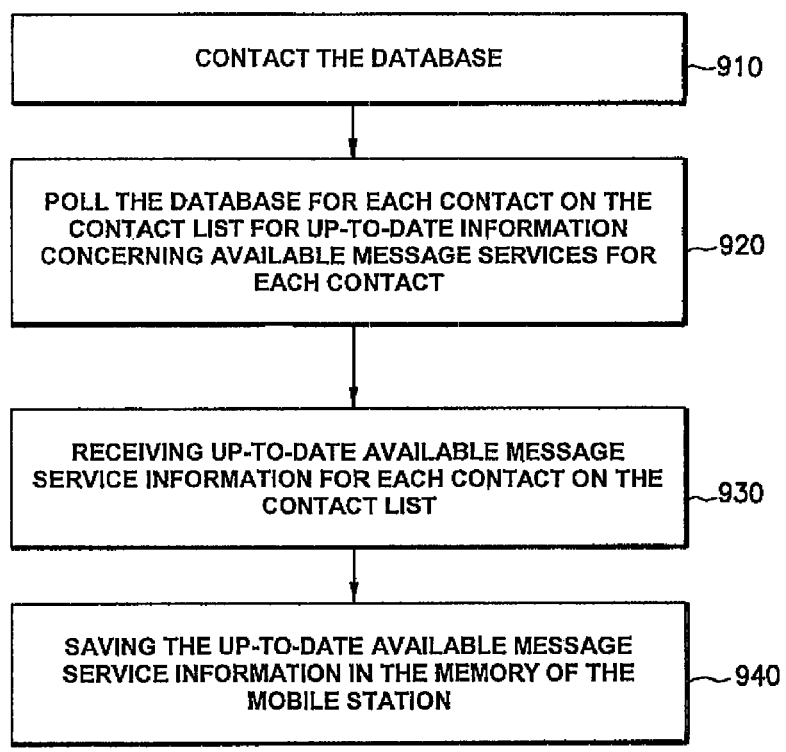
FIG. 8 is a flowchart depicting the steps of a method operating in accordance with the present invention.

FIG. 8 depicts an alternate method operating in accordance with the present invention for updating the message service availability portion of the contact list information. In the method described in conjunction with FIG. 8, the contact list information is updated by contacting a central database 75 of contact list information for each user of the wireless telecommunications network. At step 910, the mobile station contacts the database 75. This may occur in conjunction with (piggybacking) a separate communication session with a third party, or may be initiated independently. After the communication session with the database 75 is established, the mobile station polls at step 920 the database 75 for up-to-date information concerning message service availability for each contact on the contact list. The mobile station then receives the update at step 930, and stores the new up-to-date information at step 940. The next time the contact list is retrieved, the up-to-date available message service information will be displayed for each contact on the contact list.

Figure 9:
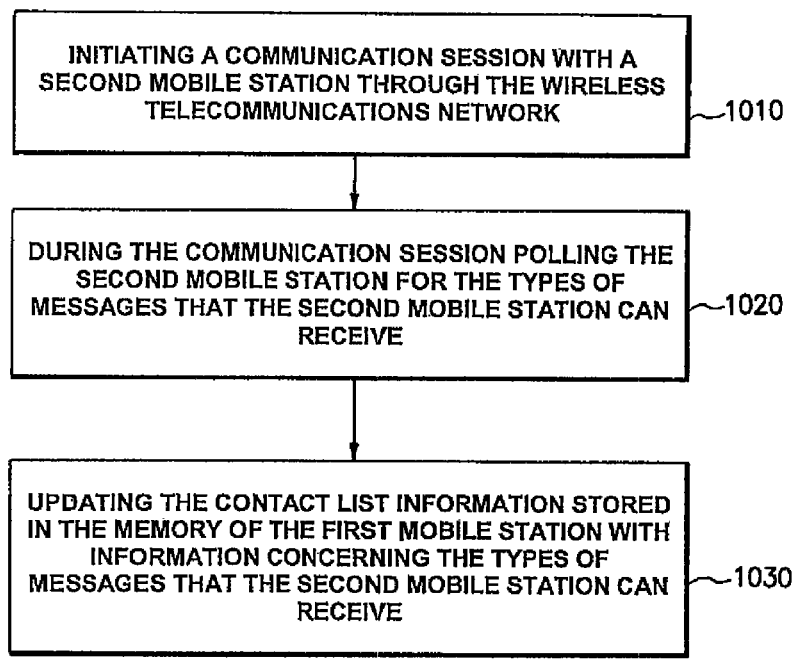
FIG. 9 is a flowchart depicting the steps of a method operating in accordance with the present invention.

FIG. 9 depicts another method for updating available message service information for contacts listed in a contact list of a mobile station 100. The method described in conjunction with FIG. 9 polls message service information in a second mobile station during a communication session with the second mobile station to determine the types of messages the contact associated with the second mobile station can receive. In the method, the mobile station 100 initiates a communication session with a second mobile station through the wireless telecommunications network 10 at step 1010. During the communication session at step 1020 the mobile station 100 polls the second mobile station for the types of messages that the second mobile station can receive. Then at step 1030, the mobile station updates the contact list information stored in the memory 130 of the mobile station with information concerning the types of messages that the second mobile station can receive.

Figure 10:
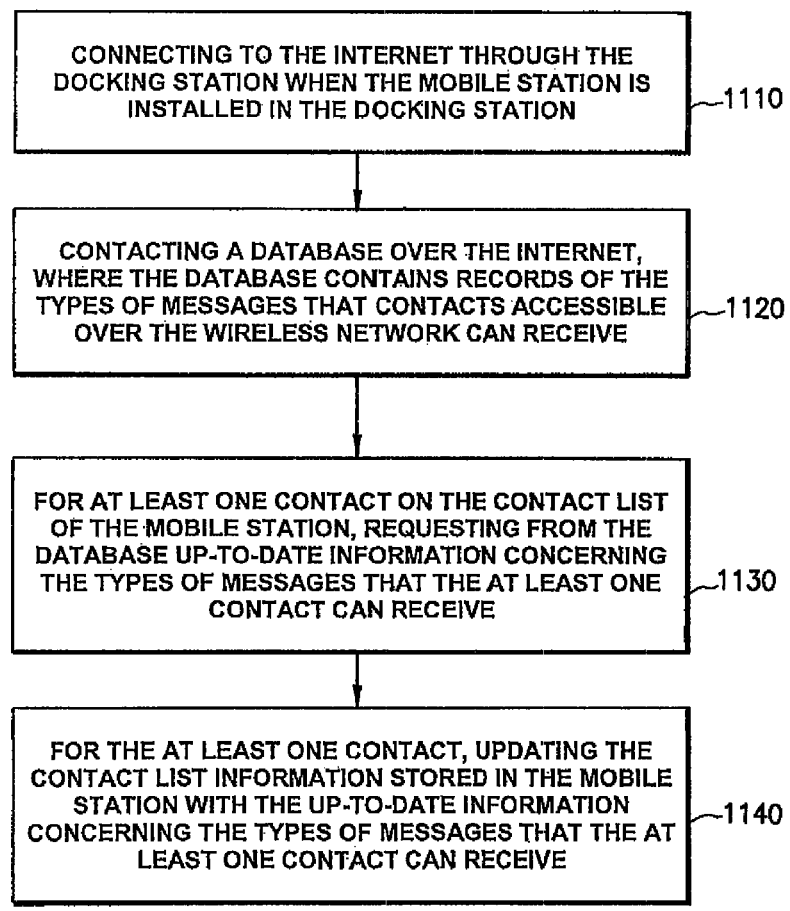
FIG. 10 is a flowchart depicting the steps of a method operating in accordance with the present invention.

Yet another method for updating the available message service portion of contact list information stored in the mobile station 100 is depicted in FIG. 10. In the method described in conjunction with FIG. 10, the mobile station 100 contacts the database 75 through the internet 70 when the mobile station is in the docking station 190. At step 1110, the mobile station 100 connects to the Internet through the docking station when the mobile station 100 is installed in the docking station. Next, at step 1120, the mobile station contacts a database 75 of contact list information for each user of the wireless telecommunications system 10. At step 1130, the mobile station 100 for at least one contact on the contact list stored in the memory 130 of the mobile station, requests up-to-date information concerning the types of messages that the at least one contact can receive. Then at step 1140 for the at least one contact, the contact list management routine updates the contact list information with the up-to-date information concerning the types of messages that the at least one contact can receive.

In alternate embodiments of the method depicted in FIG. 10, the mobile station 100 and one of the docking station 190 and personal computer 192 are equipped with a short-range wireless communications system, for example, Bluetooth. In these embodiments, the mobile station need not be placed in the docking station in order to perform the update routine. Rather, in these embodiments, the mobile station need only come close enough to the docking station 190 or personal computer 192 for the short-range wireless communications system to operate. The mobile station 100 then can connect to the internet in part through the short-range wireless communications system.

Figure 11:
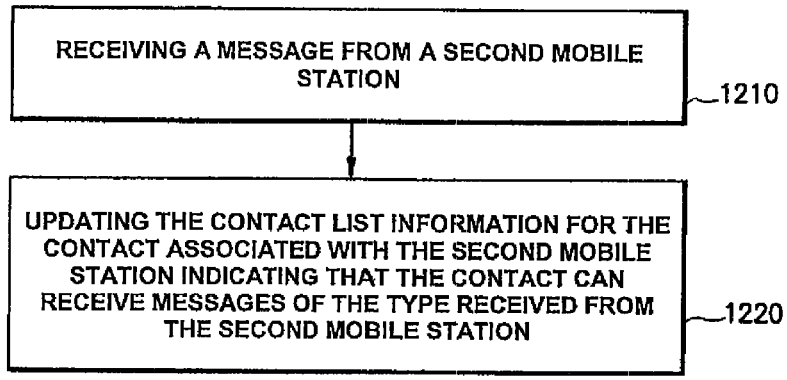
FIG. 11 is a flowchart depicting the steps of a method operating in accordance with the present invention.

A still further method for providing updates to the available message services for contacts listed in a contact list of a mobile station are depicted in FIG. 11. In the method described in conjunction with FIG. 11, the mobile station receives a message such as, for example, an e-mail from a second mobile station through a wireless connection. If the message is of a type that had not been received before from the contact, the user of the mobile station by the act of receiving the message has been informed that the contact is now capable of receiving a message corresponding to the same message type. Accordingly, when a message type that had not been received before from a contact is received, the contact list management routine can automatically update the contact list information.

FIG. 11 depicts a method for accomplishing this. In the method, at step 1210, the mobile station receives a message from a second mobile station. Next, at step 1220, the mobile station determines if the message is of a type that had been received before from the second mobile station. This is accomplished by retrieving the contact list information associated with the contact corresponding to the second mobile station, and determining whether the contact list information associated with the contact indicates that the contact can receive messages corresponding to the message type received from the contact. If not, the contact list information associated with the contact is updated at step 1230, indicating that the contact can now receive messages corresponding to the received message type.

Figure 12:
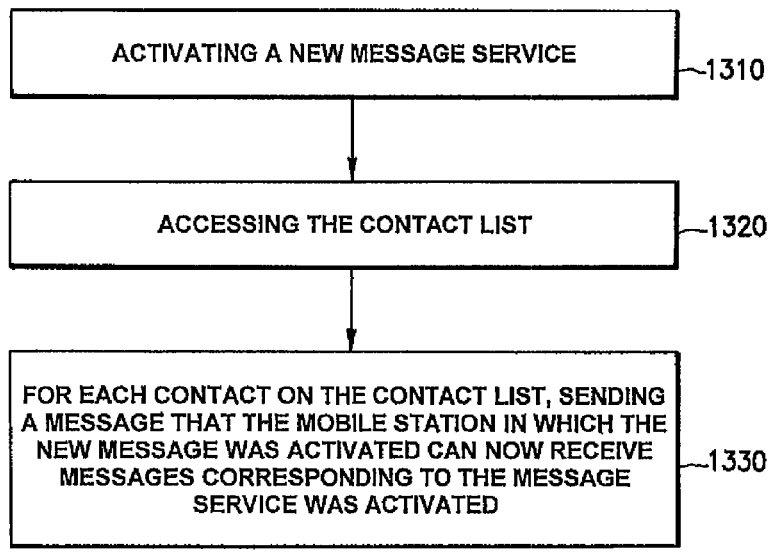
FIG. 12 is a flowchart depicting the steps of a method operating in accordance with the present invention.

Yet another method operating in accordance with the present invention is depicted in FIG. 12. In contrast to the methods described previously that generally concerned a mobile station either polling or keeping track of the types of messages that other mobile stations can receive, in the method of FIG. 12, a mobile station informs other mobile stations of the types of messages it can receive. This occurs coincidentally with the activation of a new message service.

The steps of the method are depicted in FIG. 12. At step 1310, a user of a mobile station activates a new message service that the user had previously not used. Then, at step 1320, the contact list management routine accesses the contact list stored in the mobile station. Next, at step 1330, for each contact on the contact list, the mobile station sends a message indicating that the mobile station in which the new message service was activated can now receive messages of a type corresponding to the activated message service.

Thus it is seen that the foregoing description has provided by way of exemplary and non-limiting examples a full and informative description of the best method and apparatus presently contemplated by the inventors for providing improved contact information for users of mobile stations, for example wireless telephones and personal digital assistants with wireless telephony capability. One skilled in the art will appreciate that the various embodiments described herein can be practiced individually; in combination with one or more other embodiments described herein; or in combination with contact list systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

What is claimed is:

1. A method for use in a mobile station operable in a wireless telecommunications network, the method comprising:
storing in a memory of the mobile station contact list information, wherein the contact list information comprises, for each listed contact, a name and at least one type of message service identifier for communicating with the listed contact, a listing of the types of messages the contact can receive, wherein the mobile station includes a display for displaying the contact list information, and wherein the contact list includes at least one graphical image corresponding to a message service and indicating a type of message that can be sent to a contact on the contact list using the message service, wherein the graphical image changes in appearance to indicate a status of the contact on the message service, the status specifying whether or not the contact on the contact list is able to receive the type of message indicated by the graphical image;
accessing the contact list information from the memory; and
displaying the contact list.

2. The method of claim 1 where unique icons are used in the contact list to identify each available message service.

3. The method of claim 2 where at least one of the unique icons changes appearance if a contact associated with the at least one unique icon is connected to the wireless telecommunications network.

4. The method of claim 1 further comprising:
receiving updates to the contact list information, wherein the updates concern an up-to-date list of the types of messages each contact on the contact list can receive; and
storing the updates in the memory of the mobile station.

5. The method of claim 1 further comprising
receiving a selection of a contact on the contact list;
receiving a selection of one of the types of messages that the selected contact can receive as listed in the contact list; and
initiating a communication session with the selected contact corresponding to the selected message type.

6. The method of claim 1, where the types of messages comprises at least one of the following: e-mail service; short message service; multimedia message service; video telephony service; and instant messaging service.

7. The method of claim 1 where the mobile station further comprises an information entry system, the method further comprising:
receiving a selection of at least one of the contacts from the information entry system;
receiving for the selected contact from the information entry system updates to the types of messages the selected contact can receive; and
saving the updates to the memory of the mobile station.

8. The method of claim 1 further comprising:
connecting to a database of contact information through the wireless telecommunications network;
for at least one contact on the contact list of the mobile station, requesting from the database up-to-date information concerning the types of messages the at least one contact can receive; and
for the at least one contact, updating the contact list information stored in the memory of the mobile station with the up-to-date information concerning the types of messages that the at least one contact can receive.

9. The method of claim 1 where the mobile station comprises a first mobile station, the method further comprising:
initiating a communication session with a second mobile station through the wireless telecommunications network, where the second mobile station comprises at least a memory for storing information concerning the types of messages that the second mobile station can receive;
during the communication session with the second mobile station, polling the second mobile station for the types of messages that the second mobile station can receive; and
updating the contact list information stored in the memory of the first mobile station with the information concerning the types of messages that the second mobile station can receive.

10. The method of claim 1 where the mobile station is operable with a docking station for holding the mobile station when not in use, the mobile station further comprising communications apparatus for communicating with the docking station and through the docking station with the internet, the docking station further comprising access to an internet connection and communications apparatus for communicating with the mobile station, the method further comprising:
connecting to the internet through the docking station;
contacting a database over the internet, wherein the database contains records of the types of messages that contacts accessible over the wireless telecommunications network can receive;
for at least one contact on the contact list of the mobile station, requesting from the database up-to-date information concerning the types of messages that the at least one contact can receive; and
for the at least one contact, updating the contact list information stored in the memory of the mobile station with the up-to-date information concerning the types of messages that the at least one contact can receive.

11. The method of claim 1 further comprising:
receiving a message from a contact listed in the contact list stored in the mobile station;
polling the contact list information concerning the types of messages that the contact can receive to determine if the type of message received from the contact is listed in the contact list information for that contact; and
updating the contact list information indicating that the contact can receive the type of message received from the contact.

12. The method of claim 11 wherein the types of message that a contact can receive are indicated by an icon in the contact list when the contact list is displayed on the display of the mobile station, the method further comprising:
in response to the contact list information being next displayed on the display of the mobile station, displaying an icon indicating that the contact can receive a message corresponding to the type of message received from the contact.

13. The method of claim 1 wherein the mobile station comprises a first mobile station, the method further comprising:
activating a new type of message service in the first mobile station;
in response to the new type of message of message service being activated, sending messages to mobile stations corresponding to contacts listed in the contact list of the first mobile station, wherein the messages indicate to the other mobile stations that the first mobile station can now receive the type of message corresponding to the message service that was activated; and in the other mobile stations, updating the contact list information indicating that the first mobile station can receive the type of message corresponding to the message service that was activated.

14. The method of claim 13 wherein the types of message that a contact can receive are indicated by an icon in the contact list when the contact list is displayed on the display of the mobile station, the method further comprising:

in response to the contact list information being next displayed on the display of the other mobile stations, displaying an icon indicating that the contact corresponding to the first mobile station can receive a message corresponding to the type of message service that was activated.

15. A mobile station for use in a telecommunications network, the mobile station comprising one or more processors and one or more memories including computer program code, the one or more memories and the computer program code being configured, with the one or more processors, to cause the mobile station to perform at least the following:

storing in the one or more memories contact list information, wherein the contact list information comprises, for each listed contact, a name and at least one type of message service identifier for communicating with the listed contact, a listing of the types of messages the contact can receive, wherein the mobile station includes a display for displaying the contact list information, and wherein the contact list includes at least one graphical image corresponding to a message service and indicating a type of message that can be sent to a contact on the contact list using the message service, wherein the graphical image changes in appearance to indicate a status of the contact on the message service, the status specifying whether or not the contact on the contact list is able to receive the type of message indicated by the graphical image;

accessing the contact list information from the memory; and displaying the contact list.

16. The mobile station of claim 15, wherein icons are used in the contact list in response to the contact list being displayed to indicate the types of messages a contact can receive.

17. The mobile station of claim 16 wherein, in response to the contact list information being displayed, changing the appearance of one or more icons used to indicate available message services for a contact when that contact is connected to the wireless telecommunications network.

18. The mobile station of claim 15 wherein the one or more memories and the computer program code are further configured, with the one or more processors, to cause the mobile station to perform at least the following:

receiving updates to the contact list information, wherein the updates concern addendums to information concerning the contacts comprising the contact list.

19. The mobile station of claim 18 wherein the updates are entered using an information entry system for entering information.

20. The mobile station of claim 15, wherein the one or more memories and the computer program code are further configured, with the one or more processors, to cause the mobile station to perform at least the following:

contacting a database containing contact message service information;

for each contact in the contact list, accessing a current list of the types of messages the contact can receive;

comparing the list of available message types for the contact stored in the memory of the mobile station to the current list of available message types as stored in the database; and where there are differences between the two lists, and updating the list of available message types associated with the contact stored in the memory of the mobile station with new contact information retrieved from the database.

21. The mobile station of claim 15 wherein the one or more memories and the computer program code are further configured, with the one or more processors, to cause the mobile station to perform at least the following:

initiating a communication session with a second mobile station through the wireless telecommunications network, where the second mobile station comprises at least a memory for storing information concerning the types of messages that the second mobile station can receive;

during the communication session with the second mobile station, polling the second mobile station for the types of messages that the second mobile station can receive; and updating the contact list information stored in the memory of the first mobile station with the information concerning the types of messages that the second mobile station can receive.

22. The mobile station of claim 18, where the addendums concern additions to the message services subscribed to by the contacts.

23. The mobile station of claim 18, where the addendums concern deletions from the message services subscribed to by the contacts.

24. The mobile station of claim 15, where the message services comprise at least one of the following: e-mail service; short message service; multimedia message service; video telephony service; or instant messaging service.

25. The mobile station of claim 15 wherein the one or more memories and the computer program code are further configured, with the one or more processors, to cause the mobile station to perform at least the following:

receiving a message from a contact listed in the contact list stored in the mobile station;

polling the contact list information concerning the types of messages that the contact can receive to determine if the type of message received from the contact is listed in the contact list information for that contact; and updating the contact list information indicating that the contact can received the type of message received from the contact.

26. The mobile station of claim 15 wherein the mobile station further comprises a first mobile station, and wherein the one or more memories and the computer program code are further configured, with the one or more processors, to cause the mobile station to perform at least the following:

activating a new type of message service in the first mobile station;

in response to the new type of message of message service being activated, sending messages to mobile stations corresponding to contacts listed in the contact list of the first mobile station, wherein the messages indicate to the other mobile stations that the first mobile station can now receive the type of message corresponding to the message service that was activated; and in the other mobile stations, updating the contact list information indicating that the first mobile station can receive the type of message corresponding to the message service that was activated.

27. A non-transitory computer readable memory medium for storing computer program instructions which, when executed, perform operations for controlling a contact list in a mobile station having a display, the operations comprising:
 storing in the computer readable memory medium contact list information, wherein the contact list information comprises, for each listed contact, a name and at least one type of message service identifier for communicating with the listed contact, a listing of the types of messages the contact can receive, wherein the mobile station includes a display for displaying the contact list information, and wherein the contact list includes at least one graphical image corresponding to a message service and indicating a type of message that can be sent to a contact on the contact list using the message service, wherein the graphical image changes in appearance to indicate a status of the contact on the message service, the status specifying whether or not the contact on the contact list is able to receive the type of message indicated by the graphical image;
 receiving a request to display the contact list on the display of the mobile station;
 accessing the contact list information from the memory;
 displaying the contact list, wherein the contact list information comprises at least names of contacts and information concerning types of messages each contact on the contact list can receive; and
 displaying the contact list information on the display of the mobile station, where the contact list is organized by names of the contacts, and wherein, for each contact, the types of messages the contact can receive are displayed proximate to the contact name.

28. The computer readable memory medium of claim 27 wherein message services available for contacts are depicted with unique icons.

29. The computer readable memory medium of claim 27 wherein the operations further comprise:
 receiving a selection of a contact on the contact list;
 receiving a selection of one of the types of messages receivable by the selected contact; and
 initiating a communication session corresponding to the selected message type.

30. The computer readable memory medium of claim 27, the operations further comprising:
 receiving a command to update contact list information stored in a memory of the mobile station, where the contact list information comprises at least names of contacts; telephone numbers of contacts; and information concerning types of messages each contact can receive;
 formulating a request to receive up-to-date information concerning the types of messages contacts can receive, wherein the request identifies at least the identity of contacts for which up-to-date available message service information is sought; and
 transmitting the request to a database of contact information through the wireless telecommunications network, where the database of contact information contains an up-to-date list of available message services for each contact who uses the wireless telecommunications network.

31. The computer readable memory medium of claim 30 where the operations further comprise:
 receiving the request for up-to-date subscription service information;
 for each contact identified in the request, retrieving from the database an up-to-date list of available message services for the contact;
 formulating a response to the request for up-to-date subscription service information, wherein the response contains up-to-date available message service information for each contact identified in the request; and
 transmitting the response to the mobile station through the wireless telecommunications network.

32. The computer readable memory medium of claim 31 where the operations further comprise:
 receiving the response to the request for up-to-date available message service information; and
 updating the contact list information stored in the memory of the mobile station with the up-to-date available message service information contained in the response.

33. The computer readable memory medium of claim 27, where the mobile station comprises a first mobile station, the operations further comprising:
 initiating a communications session with a second mobile station;
 polling the second mobile station during the communication session to determine the types of messages that the second mobile station can received; and
 updating the contact list information stored in the computer readable memory medium with information concerning the types of messages second mobile station can receive.

34. The computer readable memory medium of claim 27, where the mobile station comprises a first mobile station, the operations further comprising:
 receiving a message from a second mobile station, wherein the second mobile station corresponds to a contact;
 updating contact list information associated with the contact indicating that the contact can receive messages corresponding to the type received from the contact; and
 saving the updated contact list information in the computer readable memory medium.

35. The computer readable memory medium of claim 27, where the mobile station comprises a first mobile station, the operations further comprising:
 activating a new type of message service in the first mobile station;
 in response to the new type of message of message service being activated, sending messages to mobile stations corresponding to contacts listed in the contact list of the first mobile station, wherein the messages indicate to the other mobile stations that the first mobile station can now receive the type of message corresponding to the message service that was activated; and
 in the other mobile stations, updating the contact list information indicating that the first mobile station can receive the type of message corresponding to the message service that was activated.

* * * * *